United States Patent Office 3,071,912
Patented Jan. 8, 1963

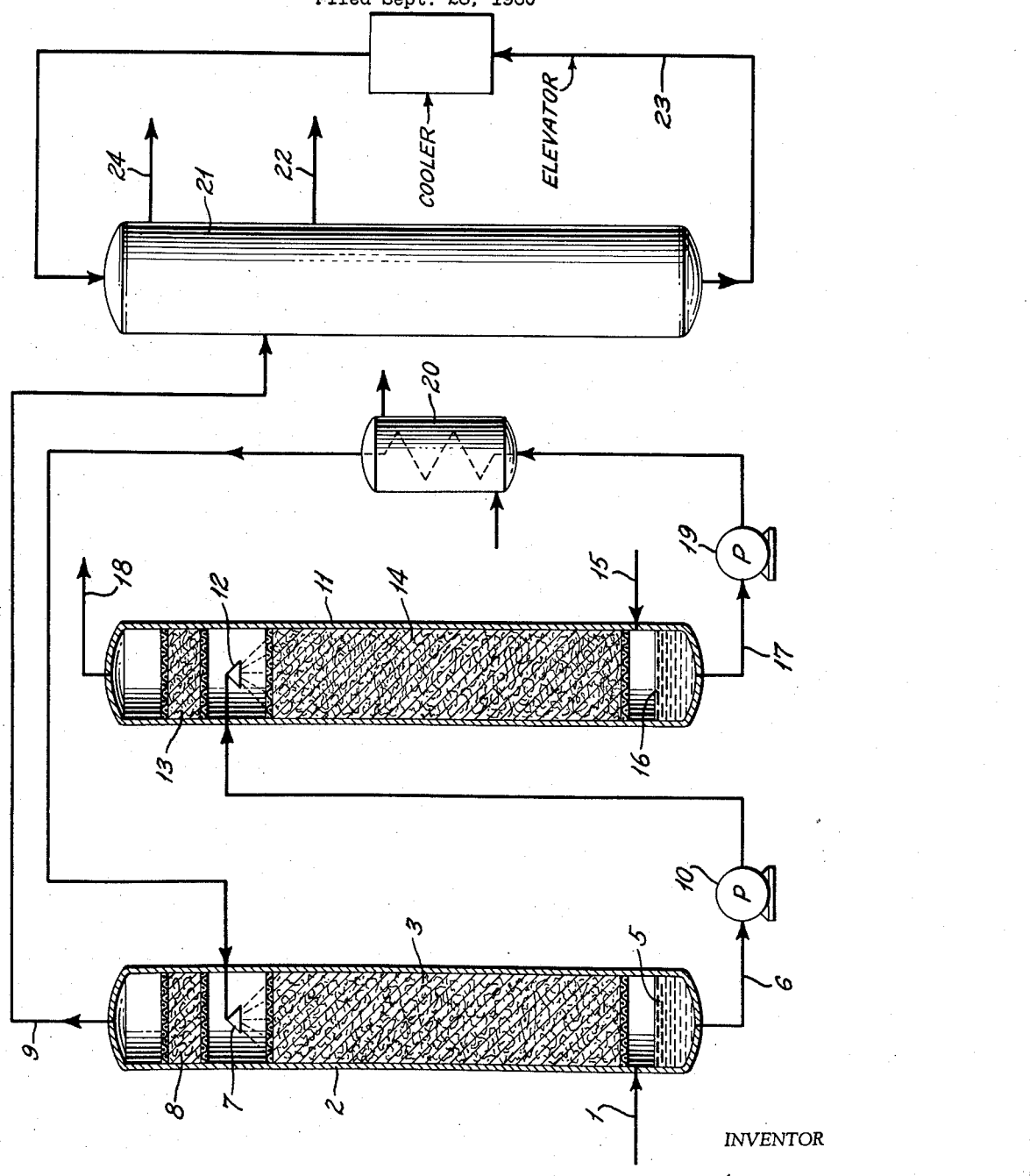

3,071,912
GAS SEPARATION SYSTEMS
George A. Akin, Kingsport, Tenn., assignor to Eastman Kodak Company, Rochester, N.Y., a corporation of New Jersey
Filed Sept. 28, 1960, Ser. No. 59,088
4 Claims. (Cl. 55—21)

The present invention relates to a process for improving the operation of gas separation systems. More specifically, the present invention provides a method for selectively absorbing a major proportion of the acetylene from gases, such as those produced in a flame-cracking process which are rich in acetylene and ethylene, the concentration being reduced to a point where the resultant gas may be subjected to high pressure adsorption to recover the remaining acetylene and ethylene.

The separation of acetylene from gaseous streams is of particular importance because commercially significant amounts of acetylene often occur admixed with other industrial gases, such as ethylene, as, for example, in high temperature pyrolysis and refinery gases. As the separation of acetylene has gained importance, various processes have been proposed for treating pyrolysis gases and the like. However, in the methods employed, it has been necessary to observe strict operating safety precautions, due to properties characteristic of acetylene and like compounds (viz: their highly unsaturated nature associated with large energies of decomposition).

One of the primary problems to be reckoned with in acetylene processes is the unstable nature of the compound. This problem prevented for a long period the widespread processing of large quantities of gases. One of the practices for the safe handling of acetylene maintains the partial pressure of gaseous acetylene below about 1.4 atmospheres, absolute pressure. Above this pressure the unstable nature greatly increases, and at certain temperatures, in the presence of an ignitor, decomposition and/or explosion can occur.

To reduce the explosion hazard of acetylene the prior art has utilized special designs for the confining vessel. For example, the vessel can be composed entirely of small pipe, about ½ inch and less in diameter, or larger pipe filled with small particles such that no large-diameter space is occupied by acetylene gas. But such a vessel does not eliminate the explosion or decomposition hazard; it merely lessens its severity.

The prior art also has proposed to reduce the danger of explosion by maintaining the concentration of acetylene in the system and, accordingly, the partial pressure of acetylene, at a reduced level by the addition of diluents to the acetylene-containing gases. The partial pressure of the acetylene is not permitted to exceed 1.4 atmospheres absolute. With this method, although the danger of explosion or decomposition is reduced, the size of the necessary equipment and the operating costs are increased, resulting in a less attractive process.

A method employed by the prior art for separating gases from a flame-cracking furnace or the like is the hypersorption process. This process employs a continuous, moving bed of carbon granules to selectively adsorb and desorb gaseous components of a mixture. Large spaces are required for the uniform engaging and disengaging of gases with the carbon particles. These large spaces cause no trouble when the gas being processed contains about equal proportions of acetylene and ethylene in conjunction with normal amounts of carbon dioxide and other gases providing the hypersorption equipment is operated at pressure below about 75 p.s.i.g. When the ratio of acetylene to ethylene increases to about 2 to 1 or higher, however, the large openings can cause considerable trouble unless the operating pressure in the hypersorption equipment is maintained at undesirably low value. This difficulty arises in the zone wherein hydrocarbon molecules containing 2 carbon atoms are disengaged from the carbon particles together with about 50% of the carbon dioxide of the incoming gas to provide a substantial concentration of acetylene. Thus, when producing a gas in the flame-cracking furnace which contains about 6% by volume acetylene, 1% by volume ethylene, and 5% by volume carbon dioxide, the partial pressure of the acetylene at the $C_2$ disengaging zone of the hypersorber is about 60% of the total pressure. The total pressure must be limited to about 34 p.s.i. absolute if the safe-handling rule of maintaining the partial pressure of acetylene below 1.4 atomospheres absolute is observed. It is recognized that dilution of acetylene with inert materials may raise the safe partial pressure or the partial pressure at which it can be handled safely but in concentrated acetylene streams this increase will be slight and regardless of the safety rule followed, the maximum total pressure selected for safety will be undesirably low for economic operation. The processing of such a cracked gas at this pressure requires relatively large equipment and large carbon circulation rate with large consumption of utilities for cooling and heating the circulated carbon. It is apparent that low pressure operation is less economically attractive than higher pressure operation.

Thus, the prior art generally has been successful only in reducing the severity of acetylene explosive hazards, except where it has eliminated them by means which result in a serious compromise of the economic attractiveness of the process.

Accordingly, it is a primary object of this invention to provide a practical means of separating acetylene from gases containing acetylene and other hydrocarbon molecules containing 2 carbon atoms without incurring the danger of explosion.

It is an additional object of this invention to provide a practical means of separating acetylene from flame-cracked gases without incurring the danger of explosion.

It is another object of the present invention to provide a process wherein acetylene may safely be separated from acetylene-containing flame-cracked reaction gases in a hypersorption unit or similar equipment in which the gases are processed under pressure in zones of large volume.

A further object of the present invention is to provide a process wherein a hypersorption unit or the like may safely be employed to separate flame-cracking or like process gases containing more acetylene than ethylene to recover essentially pure ethylene and acetylene.

It is still another object of this invention to provide a process wherein the separation of acetylene-containing gases produced by flame-cracking or like processes may be carried out in an economical manner.

Broadly stated, the present invention contemplates a process for separating and recovering acetylene from acetylene-containing gases which comprises contacting the acetylene-containing gas with a selective liquid absorption medium whereby a substantial portion of the acetylene in the gas is removed and subjecting the unabsorbed gases to an adsorption gas-separation step in contact with a solid selective adsorbent. Sufficient acetylene is removed in the absorption step so that the concentration of acetylene in the $C_2$ disengaging zone of the adsorption step (the space in which the acetylene is most concentrated) is sufficiently low to provide safe acetylene partial pressure. In highly concentrated acetylene streams, this amounts to less than about 1.4 atmospheres absolute.

The feed gas to this process may be produced by any of the known cracking methods for producing unsaturated hydrocarbon gases including substantial quantities of acetylene. Ethylene is produced in relatively large but varying proportions depending upon cracking conditions. Propylene and higher boiling hydrocarbons may be produced, particularly when the charge to the cracking process is propane, butane or higher boiling oils. Where unsaturated hydrocarbons of 3 or more carbon atoms are present, they may be advantageously removed before the gas is sent to the absorption step.

In the practice of the present invention, the cracked gas containing acetylene, ethylene and other gases is treated to remove a substantial portion of the acetylene from the feed-gas stream by selective liquid-medium absorption followed by separation of the resultant gas stream into its components in an adsorber under controlled conditions. To effect this removal, the gas stream is contacted with an absorbent liquid which selectively absorbs a portion of the acetylene from the gas. The absorbent liquid thus enriched with acetylene is passed to a desorption zone where substantially all of the gases are liberated from the absorbent liquid and a product comprising higher purity acetylene is recovered (85–90% acetylene by volume). The lean absorbent liquid is recycled to the absorption step.

The unabsorbed gases are sent from the acetylene absorption zone to a suitable adsorbent system, such as a hypersorption unit or the like, wherein the remaining 2 carbon atom components (acetylene and ethylene) of the acetylene-lean intermediate gas stream are separated from the other gaseous components.

The desorbed gases will contain acetylene and ethylene as the principal hydrocarbons. Where the gas feed being treated is produced by the flame-cracking process (and the invention is particularly adapted to such feed stocks) there is a substantial proportion of $CO_2$ present in the desorbed gases.

The tail gases may comprise methane, hydrogen, carbon dioxide, carbon monoxide and nitrogen.

The desorbed gases may be subjected to further processing to remove $CO_2$, and thereafter to a separation step to separate ethylene from acetylene. A selective liquid absorption process may be used for this final separation, similar to that used in the first step of my process. In this way, acetylene of about 99% purity and ethylene of about 98% purity can be recovered for use as raw materials in various petrochemical processes. By combining the acetylene product stream of the first step with the high purity acetylene produced as just described, acetylene of 85–95% purity may be produced.

There are a number of advantages to be gained by the use of the process of the present invention in the manner described. The present invention overcomes the above-stated disadvantages of prior methods by removing a portion of the acetylene from flame-cracked gas before it is fed into a hypersorption unit or similar equipment, in which the acetylene and ethylene portion of the gas is concentrated and processed in large spaces under pressure. With the practice of the present invention, moreover, the problems that heretofore plagued acetylene-containing gas separation systems are overcome in such a manner that separation of acetylene from flame-cracked gases and the like may be effected safely in hypersorption units or the like, with an economy not heretofore possible.

In addition, the process has the advantage of providing an acetylene stream of relatively high purity (from the absorption step) which can be used as a product as such or combined with the acetylene product stream from the adsorption (or other) separation step, which has a purity of greater than 99% by volume. The combined acetylene streams may be of about 90% purity by volume. When the process of the present invention is employed in conjunction with an absorption system such as disclosed in United States Patent No. 1,422,183, an ethylene product stream may be obtained having a purity of about 98% by volume.

While the process of the invention does require some additional equipment, it lessens the size and work requirements of the equipment downstream from the absorption unit and the cost of additional equipment is more than offset by substantial savings in the remainder of the separation unit.

The hazardous decomposition problems encountered in acetylene-containing systems have been found to be aggravated by high temperatures, high pressures and high acetylene concentrations. In addition, elevated temperatures tend to promote polymerization of homologs of acetylene which are present in the cracked gases, resulting in the production of compounds having even less stability than acetylene. It is necessary, therefore, that the process conditions under which absorption and desorption of acetylene is carried out be carefully controlled.

The temperature in the absorption and desorption zones is kept below about 170° C. and preferably below about 150° C.

Acetylene absorption is favored by reduced temperatures and elevated pressures. Desorption is favored by elevated temperatures and reduced pressures in relation to the absorption conditions. Thus, in practice of the invention, the flame-cracked gases containing acetylene are first compressed to about 25 to about 150 p.s.i.g., and cooled to a temperature in the range of about 0° C., to about 60° C., and preferably about 0° to 50° C., before they are introduced into the absorption zone. The acetylene-rich absorbent liquid from this zone is flashed in a desorption zone at a reduced pressure, usually within the range of about 5 p.s.i.a. and about 5 p.s.i.g., and a relatively higher temperature within the range of about 20° and 170° C.

Although there are many selective solvents that can be used for the absorption step in the present invention, it is usually desired to employ a solvent which has a high affinity for acetylene and a lower affinity for such gases as ethylene, methane, carbon dioxide, hydrogen, nitrogen, etc., which may be present in the crude cracked product.

Solvents useful as absorbents in the system may be selected from a variety of classes of organic compounds such as for example the ketones, aldehydes, alkyd alcohol, polyhydric alcohols and ethers and esters thereof, amines, etc. Among specific examples of compounds suitable for this service are acetone, methyl-ethyl ketone, acetaldehyde, propanol, ethyl alcohol, iso and normal propyl alcohol, butyl alcohol, furfural, trimethyl and triethyl phosphate, the glycol ethers, including monoethyl, monomethyl and dimethyl, diethylene oxide, dimethyl, ethyl and diethyl formamides, glycol monoformate, diethylene and dipropylene glycol, diethylene glycol monoacetate, cyclohexanone, pyrrolidone dimethyl sulfoxide, butyrolacetone, and the like. While any of the above are used within the scope of the invention, not all of them should be considered as equivalent, some being more effective than others. Particularly useful absorbents are dimethyl formamide and dimethoxytetraethylene glycol. The beneficial effect derived from the use of any particular solvent will vary in degree with the composition of the feed gases, the amount of solvent used, and the temperature and pressure conditions maintained during absorption and desorption.

Acetylene may be removed from the feed gas to any desired extent although 75 to 80% by volume of the acetylene present is adequate for process safety in most cases. The amount of solvent (i.e. the ratio of solvent to gas) required to effect the desired acetylene absorption therefore will vary with the initial acetylene concentration and the desired extent of acetylene removal. In addition, the amount of solvent required will depend upon the solvent employed and the process conditions of temperature and pressure. The choice of solvent flow rates and exact process conditions are within the skill of the art.

The degree of acetylene removal from the feed gas in the absorption step is co-related with conditions existing in the subsequent adsorption step. Enough acetylene is removed so that the partial pressure of aceylene in the subsequent adsorption separation step will not exceed about 1.4 atmospheres absolute at the operating pressure. The point of greatest acetylene concentration in this step is that at which acetylene and ethylene are desorbed from the solid adsorbent. Hence the degree of removal in the absorption step is related to conditions in that zone.

Acetylene in the unabsorbed gases is subsequently separated from the gases in the adsorption unit together with the other $C_2$ hydrocarbons and carbon dioxide. Since the acetylene product stream from the adsorber consists essentially of acetylene, ethylene and carbon dioxide, the amount of acetylene present must be controlled if the safe handling rule is to be observed. Therefore, there is a minimium requirement for acetylene removal which must be observed in the acetylene absorption step, i.e. that sufficient acetylene is removed to maintain the partial pressure of acetylene in the adsorber below about 1.4 atmospheres absolute in the desorption section of the adsorption separation step. Of course, the minimum requirement will depend in each case upon the composition of the acetylene-containing gas. Since the highest purity acetylene stream ultimately is obtained from the adsorption step, it is often desirable to remove in the initial absorption only enough acetylene to avoid explosive conditions in the adsorption step.

The feed gases which may be processed according to this invention may contain constituents which function as diluents for the acetylene to be separated in the adsorber. Flame-cracked gases contain ethylene, hydrogen, ethane, carbon oxides, nitrogen, methane, etc.

The adsorption step of the process may be accomplished employing any of the equipment known to the art. Selective adsorption of gases is widely practiced and is well known to the art. Adsorption equipment and its operation (hypersorption) is described, inter alia, in Berg Patent 2,519,343. Further, the final separation of acetylene from other $C_2$ hydrocarbons and carbon dioxide may be accomplished by employing methods well known in the art. The stream issuing from the adsorption step need not be processed at high pressures or temperatures and readily may be separated into its components.

The operation of the process of the present invention will be better understood from the following description of the process, the attached drawing being a schematic flowsheet of the process of the present invention.

The compressed cracked gas stream 1 from which acetylene is to be removed enters near the bottom of an acetylene absorber 2.

The cracked gas entering the bottom of the absorber column 2 is usually at about the same temperature and pressure which is maintained inside the absorber, which as previously mentioned is preferably about 0° to about 60° C. and about 25 to about 150 p s.i.g. The compressed cracked gases may have been dried previously by appropriate conventional means before introduction into the absorber.

Fresh solvent for removing acetylene, such as dimethylformamide, enters the absorber at the top and is distributed over packing 3 by a distributor nozzle 7 or other distributing device. The liquid flows down through the column countercurrent to the upward flowing cracked gas and absorbs primarily acetylene therefrom. Solvent containing primarily acetylene and minor amounts of other components is collected in the base of the column in which there is maintained a liquid level 5.

Cracked gas, relatively lean in acetylene, passes from the top of the absorber 2 through line 9. The top of the absorber may be provided with a mist eliminator 8 or similar device for hindering the carry over of solvent with the exist gases.

The off gas leaving the top of the absorber and from which up to about 75-80% by volume of the acetylene has been removed is then passed to a hypersorption unit 21 or to equivalent adsorption equipment, where the product gases are further separated into a product stream containing the unsaturated $C_2$ hydrocarbons. The acetylene partial pressure of the gas should not be above about 1.4 atmospheres absolute at the operating pressure at any point in the adsorption-desorption system. Operating pressures are preferably about 75 to about 150 p.s.i.g.

It may be desirable to add a preliminary flash tower to remove all or a major part of the relatively insoluble gaseous material from the acetylene-rich solvent stream before it enters column 11. Such a column may be fed at the top with a small amount of fresh solvent to prevent the loss of acetylene with these impurities. Or it may be desirable to operate column 11 as a fractionating flash column with fresh solvent being fed at the top where the gaseous impurities are removed while the pure acetylene is removed from a point lower in the column. Desorption zone 11 is indicated diagrammatically as a single vessel, but may comprise several vessels in accordance with known process engineering principles and techniques.

The acetylene-rich solvent stream 6 flows from the base of the absorber column 2 through pump 10 to a desorber column 11. Pump 10 may not be required if the pressure in the absorber is high enough to force the acetylene-rich solvent stream into the flash column. If desired, the acetylene-rich solvent stream may be preheated before its entry into the flash column. The flash column, like the absorber column, may contain packing 14 such as Berl saddles or the like. The column is equipped with nozzle 12 or other suitable distributing devices, in the upper portion thereof.

In the flash column 11 absorbed acetylene and other gases are liberated by the application of heat and/or reduced pressures. If desired, a stripping gas such as steam or other inert gas such as $CO_2$ or nitrogen, may be introduced through line 15, flowing upwardly through the column and facilitating stripping of the gases. Lean solvent reaching the base of the flash column is collected at 16 and is passed through line 17 by pump 19, through a cooler or heat exchanger 20, and is recycled to acetylene absorber 2 through spray nozzle 7. It may be desirable to provide intermediate surge or means not shown in the solvent line between the flash column and the absorber as will be understood.

Gases desorbed from the solvent stream in flash column or desorber 11 are passed through an entrainment separator 13 in the top of the column. The liberated gas containing primarily acetylene leaves the top of the column through line 18 and may be combined with streams from other separation units or may be recovered as a separate product stream.

More than one stage of desorption may be used. If two stages are used, acetylene is kept in solution and only undesired dissolved gases, such as $CO_2$, $CH_4$, etc. are removed from column 11. Practically pure acetylene would be removed from the next column, not shown.

The absorber 2 used in the present invention is operated at a pressure of between about 25 and about 150 pounds per square inch and a temperature of about 0° to about 50° C. The absorber may be a packed column or a column containing bubble caps, ripple trays, cascade trays, sieve plates, or the like. Packed columns are preferred. Any suitable packing material may be used with the utilization of 1″ Raschig rings being particularly preferred. However, any of the many available absorption devices may be employed. Moreover, the absorption step need not comprise a single vessel as illustrated but may comprise a series of vessels or zones operated under varying conditions, but which result in the formation of a stream of acetylene-lean gas, and an acetylene-rich absorbent.

As already indicated, the flash column 11 employed in the present invention may also be a packed column or a column containing bubble caps, sieve trays, or the like. One inch Raschig rings constitute the preferred packing material. The conditions inside the flash column are maintained to effect the liberation of substantially all of the absorbed gases. Accordingly, the column is maintained at a pressure of between about 5 p.s.i.a. and about 5 p.s.i.g. and a temperature of about between 20° and about 170° C. In the practice of the invention, to provide better solvent-gas separation in the flash column, the flash column may be provided with heating means or reboiler near the base of the desorber.

The hypersorber unit 21 may contain activated charcoal, activated alumina, activated silica, or other suitable adsorbent of which many are known. It may be equipped with elevator means 23 for circulating the adsorbent first through an adsorption zone and then through a desorption zone, when a moving-bed type operation is employed. The system is illustrated diagrammatically, a number of suitable apparatuses being available. Means, not shown, for cooling the adsorbent may be supplied. Alternatively, a group of fixed bed towers may be used in which each tower alternately passes through an adsorption and desorption cycle, one tower being used for adsorption while the other is stripped of product. The hypersorption unit may be operated at a pressure of 50–150 p.s.i.g., preferably at about 75 p.s.i.g. and higher. The temperature at the upper or adsorption end of the unit may be 5–50° C., while at the lower end may be 325–375° C. Product acetylene in combination with ethylene and carbon dioxide is withdrawn through line 22. In the event other desirable hydrocarbons may be present in the adsorption gases, the column may be equipped with means for separately recovering them. Spent gases are removed through line 24 and may be used as fuel or subjected to further separation or processing if they contain valuable components.

The gases issuing from line 22 are subjected to known absorption processes to provide substantially pure acetylene and ethylene. For example, the product stream may be subjected to the Girbitol process in which $CO_2$ is absorbed in ethanolamine, and then to selective absorption of acetylene to separate it from ethylene, in a step similar to that described in connection with the absorption step of this process.

According to the present invention, the feed gas from the flame-cracking step may be subjected to preliminary treatment prior to its arrival at the acetylene absorber. Such treatment may include, for example, absorption and stripping steps to remove all or part of the hydrocarbon components in the cracked gas heavier than acetylene or ethylene, e.g. propylene, propane, butylenes, butanes and higher. It is to be understood that such a prior treatment of the crack gas coupled with the separation process of the present invention does not depart from the spirit or the scope of the present invention.

The advantages gained by the use of the process of the present invention will be better understood by reference to the following examples. The following examples are not intended to limit the scope of the invention and are given only by way of illustration.

*Example I*

In an apparatus such as shown in FIGURE 1, 142 s.c.f.m. of compressed flamed-cracked gas containing 7.75 s.c.f.m. of acetylene, 2.9 s.c.f.m. of ethylene, and 6.8 s.c.f.m. of carbon dioxide was fed into the acetylene absorber 18 inches in diameter containing 30 feet of 1" Raschig rings operated at a pressure of about 80 p.s.i.g. and a temperature of 25° C. This gas was scrubbed with 6.4 gallons per minute of dimethylformamide which was introduced near the top of the absorber at a temperature of about 25° C. and was removed from the bottom at about the same temperature. The off-gas from the absorber contained about 1.9 s.c.f.m. of acetylene; the remainder of the acetylene having been absorbed in the solvent along with about 0.6 s.c.f.m. of other components of the flame-cracked gas feed.

The off-gas from the absorber was fed to a hypersorption unit employing activated gas adsorbent carbon to separate the remaining acetylene and ethylene from the other components of the gas. About 50% of the carbon dioxide in the feed stream to the adsorber appeared in the product stream along with the acetylene and ethylene. The carbon dioxide can be separated from the acetylene and ethylene in appropriate equipment, e.g. the Girbitol process, or by washing with caustic soda. The $CO_2$-free stream may be treated as, for example, by solvent separation as in the first step, supra, to produce about 1.0 s.c.f.m. of 99% by volume purity acetylene, and about 2.9 s.c.f.m. of ethylene of 98% by volume purity.

During this operation the hypersorption unit was operated at 75 p.s.i.g. Approximately 77.5% by volume of the acetylene was removed in the absorber ahead of the hypersorption unit. At such a pressure, the amount of circulated carbon required to separate the gases was 1440 lb./hr. The temperature of the carbon entering the hypersorption unit was about 25° C. The temperature increased from about 80° C. to about 325° C. as the carbon passed through the adsorption and then through the desorption sections. After removal from the latter zone, it was cooled to about 25° C. and recycled.

The acetylene enriched solvent from the first absorption step was transferred to the flash or desorption column operated at a pressure of about 2 p.s.i.g. A temperature of about 150° C. was maintained at the base of the column. The solvent passed down over a bed of 1" Raschig rings 30 feet deep and 18" in diameter wherein the major part of the absorbed gases were liberated. The flow of product or exit gas was about 6.1 s.c.f.m. The stripper gas was composed primarily of acetylene, the remainder being ethylene, carbon dioxide, hydrogen, nitrogen, etc. The solvent flowed to the base of the fish column from whence it was pumped through the solvent cooler, to cool it to 25° C. or below, and recycled to the acetylene absorber.

*Example II*

The process of Example I was repeated except that the acetylene absorber and flash column were bypassed. Cracked gas of the same composition and in the same amount as in Example I was compressed and fed to the hypersorption unit. The application of the safe handling rule for acetylene fixed the operating pressure at 23 p.s.i.g. in contrast to the 75 p.s.i.g. of Example I. The hypersorption unit and auxiliary separation equipment produced product streams identical to those of Example I but in this case it was necessary to circulate 2900 lbs./hr. of carbon in contrast to 1440 lb./hr. of Example I. In each case the carbon used possessed about the same adsorption characteristics.

From the above description of the process it is apparent that the present invention provides a means whereby gases from the pyrolysis of hydrocarbons may be separated into the various components, such as acetylene and ethylene, with a high degree of purity without sacrifice of high yields and economy. By the use of the process of the present invention former methods used to separate such gases as acetylene and ethylene in cracked gases may be used to increased advantage. With the practice of the present invention, a major portion of the acetylene may be separated and recovered from the original cracked gas stream, and the lean cracked gases containing part of the acetylene subsequently may be adsorbed at pressures and temperatures conducive to efficient recovery, but dangerous if used with a feed gas containing high acetylene to ethylene ratios.

Since modifications of the present invention will be obvious to one skilled in the art, this invention is intended to be limited only by the scope of the appended claims.

I claim:

1. A method for recovering high purity acetylene from a gas feed mixture containing acetylene and other gaseous hydrocarbons which comprises the steps of contacting said mixture with a liquid absorption medium which is selective for acetylene in an absorption zone and selectively absorbing a substantial part of the acetylene from said mixture, passing effluent acetylene-lean gas from the selective absorption zone into contact with a solid adsorbent in an adsorption zone, adsorbing acetylene from said lean gas, desorbing a gas rich in acetylene from said adsorbent, the amount of acetylene removed from the gas feed mixture in said absorption zone being such that the highest acetylene concentration in the subsequent adsorption-desorption steps is sufficiently low to provide a safe acetylene partial pressure.

2. A method for recovering high purity acetylene which comprises the steps of contacting a cracked gas feed stream rich in acetylene and ethylene, with a liquid absorption medium which is selective for acetylene in an absorption zone, at a temperature from about 0° C. to about 60° C. and a pressure of about 25 to about 150 p.s.i.g., selectively absorbing a substantial part of the acetylene from said stream, removing acetylene-enriched absorption liquid from said absorption zone, desorbing and recovering the dissolved acetylene therefrom at a pressure within the range of about 5 p.s.i.a. to about 5 p.s.i.g. at a temperature in the range of about 20° C. to about 170° C., passing effluent acetylene-lean gas from the selective absorption zone into contact with a solid adsorbent in an adsorption zone, adsorbing acetylene from said lean gas, removing an off-gas from said adsorption zone which is substantially free of acetylene, and recovering a gas rich in acetylene from said adsorbent; the amount of acetylene removed from the cracked gas feed stream in said absorption zone being such that the highest acetylene partial pressure in the subsequent adsorption-desorption steps is never more than about 1.4 atmospheres at the operating pressure.

3. The process of claim 2, wherein the pressure in the adsorption step is about 50 to about 150 p.s.i.g.

4. A method for recovering high purity acetylene from flame-cracking product gas mixture comprising acetylene, ethylene and carbon dioxide which comprises the steps of passing said gas mixture upwardly through an absorption zone in countercurrent contact with a down-flowing absorption liquid at a temperature from about 0° C. to about 50° C. and a pressure of about 25 to about 150 p.s.i.g., selectively absorbing a substantial part of the acetylene from said gas mixture, removing acetylene-enriched absorption liquid from said absorption zone, desorbing and recovering the dissolved acetylene therefrom at a pressure within the range of about 5 p.s.i.a. to about 5 p.s.i.g. at a temperature in the range of about 20° C to about 170° C., passing effluent acetylene-lean gas from the selective absorption zone into contact with a solid adsorbent in an adsorption zone at a pressure of about 75 to 150 p.s.i.g. and at a temperature of about 5 to 50° C., removing a non-adsorbed off-gas from said adsorption zone that is substantially free of acetylene, desorbing from said solid adsorbent a gas rich in acetylene by heating said adsorbent to a temperature of about 325 to 375° C., the amount of acetylene removed from the flame cracking product gas mixture in said absorption zone being such that the highest acetylene partial pressure in the subsequent adsorption-desorption steps is no more than about 1.4 atmospheres at operating pressure.

References Cited in the file of this patent

UNITED STATES PATENTS

| | | |
|---|---|---|
| 1,894,763 | Eisenhut et al. | Jan. 17, 1933 |
| 2,325,577 | Balcar | July 27, 1943 |